United States Patent [19]

Kobylarz et al.

[11] 3,961,371

[45] June 1, 1976

[54] VIBRATION ABSORPTION SYSTEM FOR A CARD READING MECHANISM

[75] Inventors: Lawrence P. Kobylarz, Howell; Ronald H. Mack, Plymouth, both of Mich.

[73] Assignee: Burroughs Corporation, Detroit, Mich.

[22] Filed: Dec. 20, 1974

[21] Appl. No.: 534,679

[52] U.S. Cl. .......................... 360/101; 235/61.11 D; 360/107
[51] Int. Cl.² ................... G11B 21/02; G11B 21/18; G06K 7/01
[58] Field of Search ................. 360/107, 101, 2, 88; 188/1 B; 235/61.11 D

[56] References Cited
UNITED STATES PATENTS

| | | | |
|---|---|---|---|
| 3,803,388 | 4/1974 | Williamson et al. | 360/101 |
| 3,818,505 | 6/1974 | Garrett | 360/107 |

*Primary Examiner*—Robert S. Tupper
*Attorney, Agent, or Firm*—Ronald L. Taylor; Edwin W. Uren; Carl Fissell, Jr.

[57] ABSTRACT

A dampening system operative to effectively lower the transmission function of an external frequency coming in on a drive mechanism as to an associated magnetic read head so that the head's natural frequency is significantly below its response level.

25 Claims, 4 Drawing Figures

VIBRATION ABSORPTION SYSTEM FOR A CARD READING MECHANISM

BACKGROUND OF THE INVENTION

1. Field of the Invention

This invention relates to dampening devices in general and particularly to vibration dampeners on cable drives used to move sensitive magnetic read heads.

2. Prior Art

In the past, when an external unwanted vibration was transmitted down a drive cable to an associated magnetic read head causing said head to pick up such distortions, the means of remedying such problems were limited to two alternatives both being relatively expensive.

The first of the traditional solutions was to eliminate the external excitation at its source. Since the drive motor was usually the source of such disturbances, it would have to be replaced by a more expensive motor to achieve a degree of quiet running without being a generator of such vibration.

The other solution was to isolate the magnetic read head from the unwanted vibration traveling down its drive cable. This would usually take the form of combinations of relatively complex springs and dampeners which would of course add more unwieldly bulk and weight to the device not to mention the expense that would be way out of proportion to any vibration reduction achieved. As such there existed a need for a simple and inexpensive means of reducing externally induced drive cable vibration as sensed by an associated magnetic read head.

SUMMARY OF THE INVENTION

Accordingly, it is an important object of the invention to provide an improved means of dampening vibrations traveling down a drive cable to and as sensed by an associated magnetic read head.

A further important object of the invention is to provide a dampening device of simple design that is inexpensive to manufacture.

It is an another important object of the invention to provide a dampening device that will lower the transmissibility of the excitation frequency traveling down the drive cable mechanism to a point below the response level of the magnetic read head.

Yet another important object of the invention is to provide a dampening device that will convert the natural frequency of the magnetic read head to a frequency below the excitation frequency and thus the response level of the magnetic head.

Another further object of the invention is to provide a dampening element interposed between the drive cable and the associated magnetic read head whose spring constant is operative to help to produce the desired natural frequency mentioned supra.

It is yet another object of the invention to provide a dampening element having a bias spring for constraining the dampening element in such a manner so as to keep its spring constant invariable.

A final object of the invention is to provide a dampening element having a relatively massive bulk for cooperating with the dampening element's spring constant to lower the natural frequency.

DETAILED DESCRIPTION OF THE INVENTION

Figure 1:
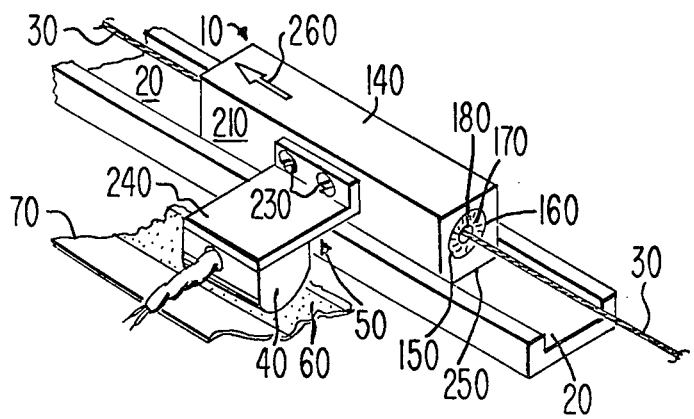
FIG. 1 is a perspective view of the dampening device and its operating environment.

In the preferred embodiment of the invention as shown in FIG. 1, a dampening device 10 slidably translates or moves along a track 20 pulled by a motor driven cable 30. While being so pulled, a magnetic read head 40 mounted along side the dampening device 10 via a clamp 50 operatively reads a magnetic stripe 60 on a document 70.

Figure 2:
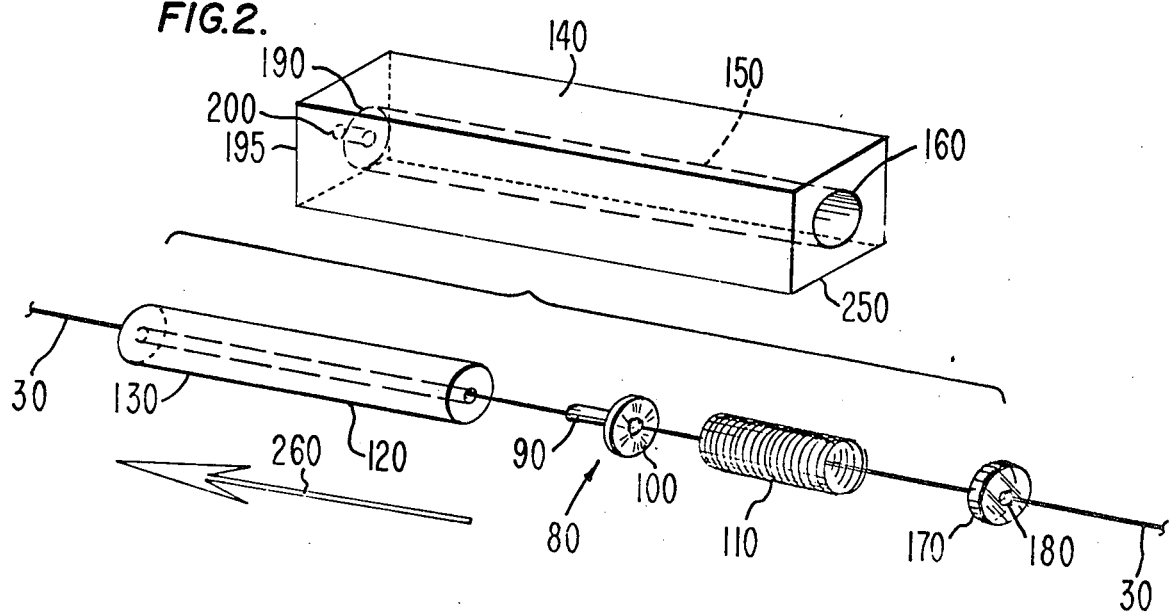
FIG. 2 is an exploded perspective view of the dampening device of FIG. 1 before assembly.
Figure 3:
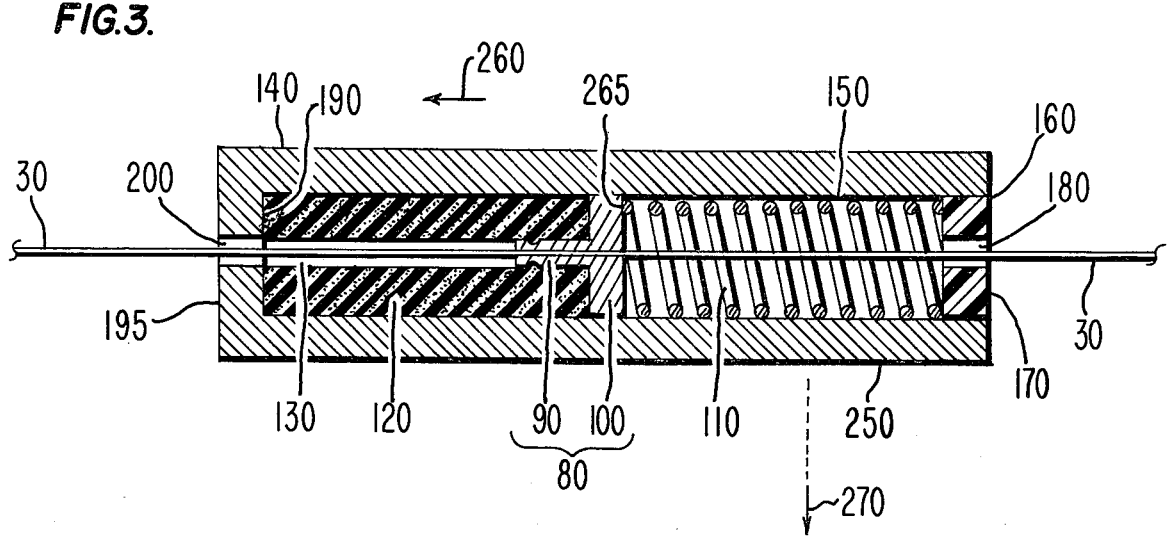
FIG. 3 is a side view of the assembled dampening device of FIG. 2.

The dampening device 10 itself as shown in FIGS. 2 and 3 is comprised of a clinch button 80 having a cylinder portion 90 axially traversed by the cable 30 and a radial disk 100 portion perpendicular to the axis of the cable. The cylinder portion 90 is clinched onto the cable 30 to fixedly secure the clinch button 80 to a desired point along the axis of the cable 30 thereby serving as a platform for the device 10. Abutting a side of the radial disk portions 100 opposite that abutting the cylinder portion 90 is a helical compression spring 110 whose axis is coincidental with that of the cable 30. Abutting a side of the radial disk portion 100 opposite that which abuts the spring 110 is a dampening element 120. The element 120 is cylindrical in shape and has a cylindrical hole 130 running down its axial length of slightly greater diameter than the cable 30 such that the cable 30 will not normally touch the dampening element 120, but rather will be in contact only with the cylinder portion 90 of the clinch button 80 which extends slightly into the dampening element's cylinder hole 130.

The dampening element 120 itself is composed of a relatively soft spongy wad of material such as polymeric as is preferred or alternatively rubber or urethane that has been foamed to the desired spring constant by methods well known in the art.

Snuggly encompassing the dampening element 120, clinch button 80, and spring 110 is a container 140 having a relatively large mass element. The outer dimensions of the container or mass element 140 are that of a rectangular box whose longitudinal axis coincidents with the cable's 30 axis. Running along the longitudinal axis of the box 140 is a bore 150 of slightly greater diameter than the dampening element 120, clinch button 80 and spring 110, but close enough to be snug. The bore 150 is open on the end 160 abutting the circumference of the spring 110, but is capped by a plastic snap-in plug 170 having a hole 180 in its center slightly greater than the cable 30 diameter to allow the cable 30 to pass uninterrupted therethrough. At the opposite end 190 of the bore 150 is a natural wall 195 of the rectangular box 140 itself which has a hole 200 piercing the wall 195 at a point coincidingly with the center of the bore 150 and also with the axis of the cable 30. Since the wall hole 200 is of slightly greater diameter than the cable 30, it will also thus allow uninterrupted passage therethrough. The net result of this as alluded to before is that the drive cable 30 will only contact the clinch button 80 thus forcing all vibration to be controllably conducted to the dampening element 120 via the button 80.

Extending from a side wall 210 of the rectangular box 140 is an L-shaped bracket or clamp 50, as mentioned supra, a vertical surface of the clamp 50 being attached to the rectangular box 140 by a pair of metal screws 230, and a horizontal projection 240 of the clamp serving to securably mount the magnetic read head 40 so that the head 40 is dependably suspended from the rectangular box 140 for readable cooperation with a magnetic stripe 60 of a document 70 as the rectangular box 140 is moved along the axis of the stripe 60. The bottom side 250 and lower side walls of the rectangular box 140 serve as a guide for the box 140 as it axially slides along the track 20 when drawn by the drive cable 30.

In operation, the dampening device 10 and magnetic read head 40 are pulled by the motor driven cable 30 along the track 20 in the direction shown by the arrow 260 as the magnetic head 40 reads the document stripe 60. When the dampening device 10 is stationary, the spring 110 will be compressibly biased by means of its abuttment against the side 265 of the stationary clinch button 80, the other end of the spring 110 serving to apply a biasing effect to the rectangular box 140 and to the end wall 195 thereof by means of the limiting abuttment against the cap 170. This biasing effect of the spring 110 applied to the end wall 195 of the rectangular box 140 serves to maintain the dampening element 120 in a slightly compressed state between the end wall 195 and the radial disk portion 100 of the clinch button 80, such slightly compressed state of the dampening element 120 being defined as a calculated normal minimum spring constant of the dampening element effective for offsetting shrinkage that may occur in the element and for compensating for variations in element length. Another example of the kinds of problems that the minimum spring constant of the dampening element 120 is effective in overcoming would be the inadvertent tilting of the axis of the cable, as in the direction of the arrow 270 shown in FIG. 3. Once the dampening system 10 is moved for reading the magnetic stripe 60, the spring 110 is relaxed and the slightly compressed state of the dampening element 120 is maintained by the pulling force of the cable 30 as exerted through the radial disk 10 of the clinch button 80, the spring constant of the dampening element 120 being thus sustained throughout each reading cycle.

Figure 4:
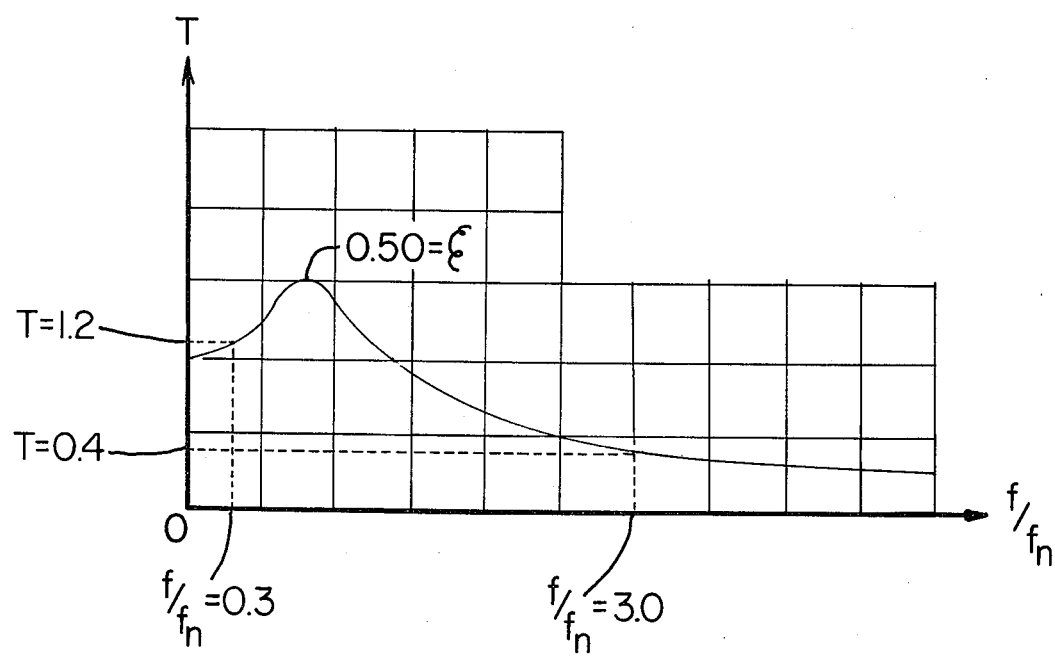
FIG. 4 is a transmissibility curve indicating the characteristics of the dampening device of FIG. 2.

The relationships that structure the dampening aspect of the invention rest primarily in the interaction between the spring constant of the dampening element 120, the excitation frequency of the drive cable 30, and the mass of the rectangular box 140, all of which have an influence on the operation and effectiveness of the dampening system 10. Particularly, it is required to have a spring constant and mass that will transduce or reduce the natural frequency of the dampening system to a point below the excitation frequency of the cable and the response level of the head 40 for a desired transmission function. The spring constant (K) of the cable 30 is the rated load (R) of the cable 30 as given by the manufacturer divided by the length (L) of the cable 30 (measured from the drive motor (not shown) to the clinch button) or $K = R/L = 320/16$ inch $= 200$ lbs./inch. The natural frequency ($fn$) of the system 10 without dampening is $fn = \frac{1}{2}\pi \sqrt{K/m} = 3.13 \sqrt{K/w}$ where $m =$ mass and $w =$ weight of the rectangular box 140 which is 0.187 lbs. Thus $fn = 3.13 \sqrt{200/.187} = 104$ cps. In our embodiment the forced frequency or external excitation source frequency ($f$) which comes from the motor has a fundamental frequency of 30 cps. Taking these frequencies as a ratio where $f/fn = 30/104 = 0.288$ and assuming an underdampened condition with a dampening ratio of $\epsilon = 0.5$, we find by looking at our transmissibility curve as found in any mechanical vibration textbook and as shown in FIG. 4, that the transmission function (T) is 1.2. As this is a relatively intolerable figure since it is greater than 1, indicating relatively high transmission, the need for dampening to obtain a figure well below one is apparent. A more desirable figure would be $T = 0.4$, which would transmit little of the excitation frequency to the head 40. If we look back at our curve in FIG. 4, we can see that for $T = 0.4$ and $\epsilon = 0.5$ the $f/fn = 3.0$. The new natural frequency is thus $fn = 30/3 = 10$ cps which is less than the forced excitation frequency and the response level of the magnetic head 40, thereby disallowing to a large degree any disturbing resonanting of the head 40 by the excitation frequency. Substituting back into our original spring constant equation supra, we find that $fn = 10 = 3.13 \sqrt{K/.187}$ or $K = 1.9$ or $\approx 2$ lbs./inch, this being the desired spring constant as foamed into our dampening element 120. It is well to remember, at this point, that the weight (w) of the box 140 is an independent variable which enables us to scale down to the range of possible spring constants (K) for dampening elements 120 such as polymerics, thus giving us the desired natural frequency (fn) of dampening system 10 for a given transmission function (T).

The primary features of the invention are thus a low cost dampening element 120 foamed to the correct spring constant (K) and biased by a spring 110 that evens out physical length variations of the dampening element 120. The element 120 is enclosed by a heavy rectangular box 140 whose very weight (w) enables a desired natural frequency (fn) to be obtained for a given transmission function that is within the possible range of spring constants (K) for the type of dampening element 120 used. The new natural frequency (fn) of 10 cps for a T of 0.4 of the dampening element is far below the forced excitation frequency (f) of 30 thus disallowing most cases of resonance distortion since the forced frequency (f) acts as a fundamental harmonic. For those random forced frequencies that do happen to coincide with the new natural frequency (fn) of 10 cps, the resultant potentially destructive resonance will only reach into the bandwidth of the magnetic read head 40 as attenuated harmonics due to the low T of 0.4 and thus will not be picked up by the head 40.

From the foregoing description of a specific apparatus illustrating the fundamental features of the invention, it will now be apparent to those skilled in the art that the invention may be constructed in a variety of forms without departing from the true spirit and scope thereof. Accordingly, it is to be understood that the illustrated apparatus disclosed herein is a preferred embodiment of the invention and that the invention is not to be limited thereby but only by the appended claims.

What is claimed is:

1. A vibration absorbing system for use in a reader mechanism including a read head, a track means guiding the head for movement along a longitudinal axis, a driven-cable for moving the read head along the track, a coded stripe to be read along to its longitudinal axis by the read head, said system being effective for damping frequency vibrations applied to the driven cable and to reduce said vibrations to a point below the response level of the read head, said vibration absorbing system comprising:
  a. a housing of predetermined length encompassing a portion of said cable and guidably supported by said track means, said housing being provided with a pair of apertured end walls through the apertures of which said cable enters and exits, said head being mounted on said housing,
  b. a moving wall divider provided within said housing and fixed to said cable, said moving wall divider separating the interior of said housing into a pair of interior compartments,
  c. a damping element of predetermined density and compressible resiliency disposed in the interior compartment on the side of said movable wall divider corresponding to the direction in which said cable is driven, said damping element abutting against said movable wall divider and a corresponding apertured end wall of said housing and being axially traversed by said cable, and
  d. a compression spring of predetermined length and pitch disposed within the other of said compartments and abutting against said movable wall divider and the opposite apertured end wall of said housing, whereby the biasing effect of the moving wall divider upon the damping element when the cable is driven, and the biasing effect of the spring upon the damping element to normalize the bias level of the damping element when the cable is deactivated, effectively reduce the frequency vibrations caused by the excitation of the cable.

2. The vibration absorbing system according to claim 1 wherein said moving wall divider is a radial disk fixably secured to the cable interiorly of said housing.

3. The vibration absorbing system according to claim 2 wherein said damping element is a cylindrical wad of spongy material having a spring constant that bears a predetermined relationship to the mass thereof such as to provide the desired reducing capability.

4. The vibration absorbing system according to claim 3 wherein said cylindrical wad of spongy material is provided with an inner cylindrical wall through which said cable traverses said damping element, the diameter of said inner cylindrical wall being slightly larger than the outer diameter of said cable.

5. The vibration absorbing system according to claim 4 wherein said radial disk is provided with a hollow cylindrical protrusion extending into said inner cylindrical wall of said cylindrical wad comprising said damping element, said cylindrical protrusion being crimpably secured to said cable to be movably activated therewith.

6. The vibration absorbing system according to claim 3 wherein said cylindrical wad is composed of a polymeric material.

7. The vibration absorbing system according to claim 6 wherein said polymeric material has a spring constant of approximately two.

8. The vibration absorbing system according to claim 1 wherein said housing is a rectangular box the longitudinal axis of which coincides with the axis of said cable.

9. The vibration absorbing system according to claim 8 wherein said rectangular box comprising said housing is provided with an inner bore the longitudinal axis of which coincides with the axis of said cable, said bore containing said damping element, said moving wall divider, and said compression spring.

10. The vibration absorbing system according to claim 8 further comprising a L-shaped bracket including a relatively vertical leg and a relatively horizontal leg, said vertical leg is mounted on the surface of one of the exterior walls of said rectangular box, and said horizontal leg supports the read head.

11. The vibration absorbing system according to claim 1 wherein said apertured end wall adjacent said second interior compartment of said housing is comprised of a snap-in plastic like plug, said plug having a central aperture of slightly greater diameter than the diameter of said cable and being axially coincident therewith.

12. A device for dampening external excitations below the response level of an associated read head, the read head being a part of a reader apparatus including a magnetic stripe operative to be read by the read head, a track means guiding the read head for movement along the longitudinal axis of the magnetic stripe, and a drive cable for moving the read head, the device comprising:
  a. housing means mounting said magnetic stripe reading head,
  b. a damping element of predetermined density and compressible resiliency disposed within said housing means, and
  c. means responsive to the starting and stopping of said drive cable and said reading head effective for applying a constant bias to said damping element whereby the frequency vibrations caused by the starting and stopping excitation of the drive cable are reduced below said response level of said reading head.

13. The dampening device according to claim 12 wherein said housing means is provided with a pair of apertured end walls through the apertures of which the cable enters and exits.

14. The dampening device according to claim 13 further comprising a L-shaped bracket including a relatively vertical leg and a relatively horizontal leg, said vertical leg is operative to be mounted on the surface of one of the exterior walls of said housing means, and said horizontal leg is operative to be securably and movably supporting the read head.

15. The dampening device according to claim 13 wherein said housing means is a rectangular box the longitudinal axis of which coincides with the axis of the cable.

16. The dampening device according to claim 15 wherein said rectangular box comprising said housing is provided with an inner bore the longitudinal axis of which coincides with the axis of the cable, said bore containing said damping element and said responsive means.

17. The dampening device according to claim 13 wherein said responsive means comprises a moving wall divider provided within said housing means and fixed to the cable and separating the interior of said housing means into a pair of said moving wall divider interior compartments said damping element being disposed within the interior compartment on the side of said moving wall divider corresponding to the direction in which the cable is driven.

18. The dampening device according to claim 17 wherein said apertured end wall adjacent said first interior compartment of said housing is comprised of a snap-in plastic like plug, said plug having a central aperture of slightly greater diameter than the diameter of the cable and being axially coincident therewith.

19. The dampening device according to claim 17 wherein said responsive means additionally comprises a compression spring of predetermined length and pitch disposed within the other said compartments and abutting against said movable wall divider and the corresponding apertured end wall of said housing means said constant bias being applied to said damping element by said moving wall divider when the cable is driven and by said spring and said pair of apertured end walls when the cable is deactivated.

20. The dampening device according to claim 14 wherein said moving wall divider is a radial disk fixably secured to the cable interiorly of said housing means.

21. The dampening device according to claim 20 wherein said damping element is a cylindrical wad of spongy material having a spring constant that bears a predetermined relationship to the mass thereof such as to provide the desired reducing capability.

22. The dampening device according to claim 21 wherein said cylindrical wad is composed of a polymeric material.

23. The dampening device according to claim 22 wherein said polymeric material has a spring constant of approximately two.

24. The dampening device according to claim 21 wherein said cylindrical wad of spongy material is provided with an inner cylindrical wall through which said cable traverses said damping element, the diameter of said inner cylindrical wall being slightly larger than the outer diameter of said cable.

25. The dampening device according to claim 24 wherein said radial disk is provided with a hollow cylindrical protrusion extending into said inner cylindrical wad comprising said damping element, said cylindrical protrusion being crimpably secured to the cable to be movably activated therewith.

* * * * *